United States Patent Office 3,113,153
Patented Dec. 3, 1963

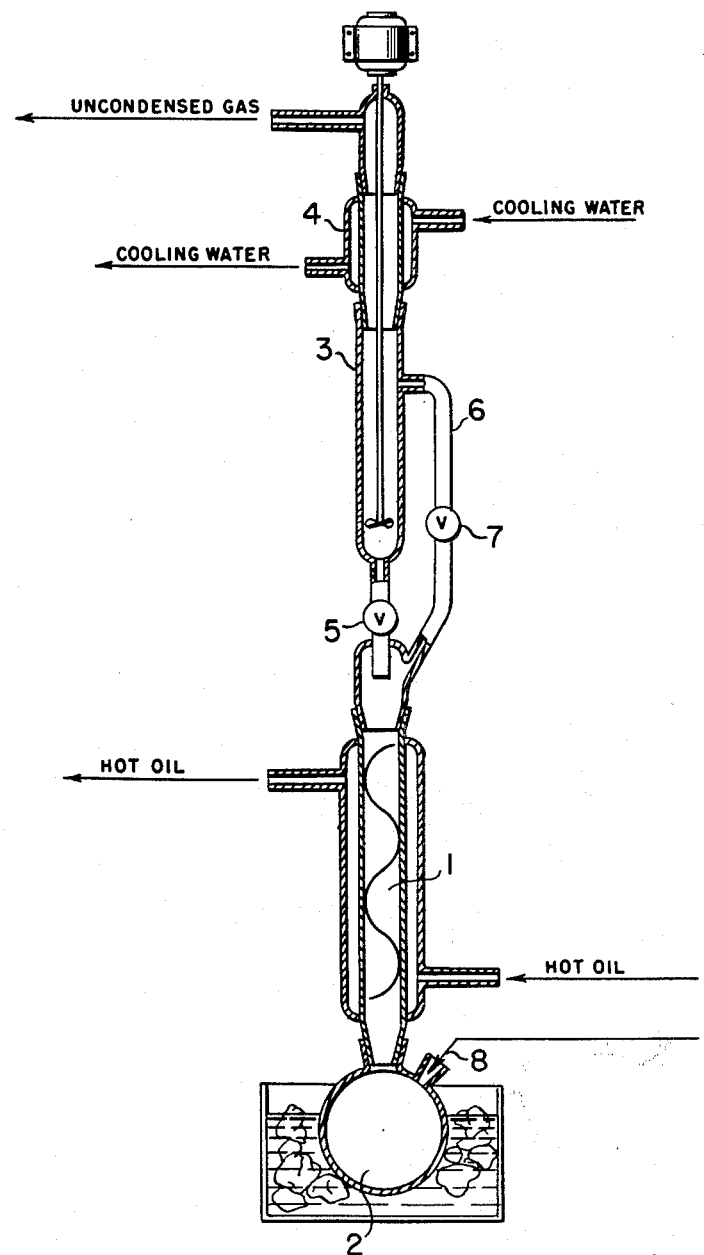

3,113,153
PREPARATION OF ETHYLDECABORANE
Joseph A. Neff, Niagara Falls, and Edward Wandel, Buffalo, N.Y., assignors, by mesne assignments, to Olin Mathieson Chemical Corporation, a corporation of of Virginia
Filed July 1, 1955, Ser. No. 519,308
6 Claims. (Cl. 260—606.5)

Our invention relates to a method for the preparation of liquid alkylated decaboranes, particularly ethylated decaboranes such as monoethyldecaborane and diethyldecaborane.

The preparation and manner of using liquid alkylated decaboranes, including ethyldecaborane, as fuels is described in Altwicker, Garrett, Weilmuenster and Harris application Serial No. 497,407, filed March 28, 1955, and issued as U.S. Patent No. 2,999,117 on September 5, 1961. In accordance with our present invention, we have discovered a new method whereby liquid ethylated decaboranes, such as monoethyldecaborane and diethyldecaborane, can be manufactured.

Thus, we have found that monoethyldecaborane and diethyldecaborane can be prepared by passing ethylene and hydrogen chloride into a molten mixture of decaborane and aluminum bromide or aluminum chloride or a mixture thereof. When carrying out the reaction, the temperature of the decaborane can vary from its melting point (about 100° C.) to about 200° C. At higher temperatures, the aluminum halide catalyst appears to react with the decaborane, resulting in an undesirable reduction in the yield of the desired product. The amount of hydrogen chloride used will generally vary from about 0.01 mole (a catalytic amount) to 2.5 moles per 1 mole of decaborane. The quantity of aluminum bromide or aluminum chloride generally used will vary from 0.05 to 0.50 mole per mole of decaborane and the amount of ethylene used can be varied quite widely, generally from 0.5 to 4.0 moles per 1 mole of decaborane, depending on the method of operation and the particular type of product desired.

The drawing illustrates an apparatus suitable for practicing our invention.

The following examples illustrate in detail various embodiments which fall within the scope of our invention. In the examples, the term "moles" means gram moles unless otherwise specified.

Example I

Ethyldecaboranes were prepared by passing ethylene and hydrogen chloride into molten decaborane in the presence of aluminum chloride (all at atmospheric pressure).

In the experiment conducted, a mixture of 0.081 mole of decaborane and 0.008 mole of aluminum chloride was melted in a glass tube of one inch diameter which was immersed in an oil bath. The tube was provided with a sintered glass bottom, below which there was a smaller tube for the introduction of the hydrogen chloride and ethylene used. A mixture of hydrogen chloride (0.241 mole) and ethylene (0.145 mole) gases was injected through the sintered glass bottom in the tube containing the decaborane. The melt was about two inches deep. The gas mixture was injected over one and one-half hours as the oil bath temperature was held at 98° to 106° C. Wet test meters and rotameters were used to measure the gases. Practically all the hydrogen chloride was recovered while 0.066 mole of ethylene were absorbed.

The resulting mixture was quenched with water (25 ml.) at 25° C. After the water was removed the remainder was distilled under vacuum. One gram of decaborane was recovered at the start of the distillation. An additional six-tenths of a gram of decaborane was trapped in the condensers during the distillation. The first cut of 3.2 grams was taken at the vapor temperature of 35° to 63° C. at 0.30 mm. of mercury. The second cut of 3.1 grams was removed at 63°–82° C. at 0.30 mm. of mercury. The residue weighed 5.2 grams. A total of 13.1 grams of materials was accounted for.

Infrared analysis showed the first cut to be mainly monoethyldecaborane with a small amount of diethyldecaborane. Chemical analysis indicated a boron content of 66.2% by weight. The second cut was analyzed by infrared to be a mixture of diethyldecaborane and monoethyldecaborane with the diethyldecaborane present in a larger amount together with a small amount of decaborane. This sample had a boron content of 60.7% by weight as determined by chemical analysis. The residue had 61.3% boron, 26% carbon and 11.7% of hydrogen by weight.

Example II

To 0.1 mole (12.2 g.) of molten decaborane and 0.01 mole (2.8 g.) of aluminum bromide, at 111°–116° C., was added a mixture of 0.16 mole of ethylene and 0.46 mole of hydrogen chloride over a 30 minute period. The reaction mixture was stirred throughout the reaction period. About 25 cc. of ice water, which had been acidified with a trace of hydrochloric acid, was added to the reaction mixture to stop the reaction. The crude product was dissolved in 25 ml. of ethyl ether and upon standing two layers were formed; the top layer contained the product dissolved in ether and the bottom layer was essentially water. The water layer was drawn off and the ethyl ether was distilled overhead at a slightly reduced pressure. Distillation was continued under reduced pressure until all the water had been removed. Then the reaction product was distilled under vacuum to yield 1.9 g. of decaborane, three cuts of liquid totalling 8.4 g., and 5.2 g. of residue. The three cuts were analyzed by infrared. The first cut of 2.6 g., distilled at 0.25 mm. of mercury at 63°–68° C., was estimated, from infrared analysis, to be 75% by weight monoethyldecaborane and 25% diethyldecaborane. The second cut of 3.9 g. was distilled at 0.25 mm. at 68°–83° C. and contained a mixture of equal parts by weight of mono- and diethyldecaborane. The third cut of 2.9 g. which distilled at 0.30 mm. at 83°–98° C. contained diethyldecaborane and triethyldecaborane. The 5.2 g. of solid residue was shown by analysis to contain 55 percent boron, 5 percent hydrogen, 5 percent carbon and 5 percent bromine. The conversion of decaborane was 84 percent and the yield of liquid product was 65 percent, based on the decaborane consumed and assuming all the liquid product to be monoethyldecaborane.

Example III

This experiment illustrates the use of a solvent, in this case cyclohexane, as an agent for the solution of the decaborane.

The apparatus used, as shown in the drawing, consisted of a jacketed reactor 1 of about 0.50 inch internal diameter and 10 inches in length which was heated by hot circulating oil, a product receiver 2 of 250 cc. capacity in which any products formed from the reactor were collected, a dissolving chamber 3 which was situated just above the reactor and was connected to it by means of ground-glass joints, and a water-cooled condenser 4 of about 0.75 inch internal diameter and 5 inches in length which was attached to the dissolving chamber by means of ground-glass joints. At the bottom of the dissolving chamber there was a stopcock 5 which controlled the flow of the decaborane-cyclohexane-catalyst mixture into the reactor. A side arm 6 (provided with stop-cock 7) connected between the top of the reactor and a point above the initial liquid level of the dissolving chamber allowed gaseous materials to by-pass the dissolving chamber and pass from the top of the reactor up into the condenser. Cyclohexane condensed was returned to the reactor. Unreacted ethylene and hydrogen halide formed during the reaction which were not condensed were led through a hydrochloric acid absorber followed by a wet-test meter.

In this experiment 12.2 g. of decaborane and 2.8 g. of aluminum bromide were added to 90 cc. of cyclohexane at a temperature of 60°–70° C. The mixture was stirred during the addition of the decaborane and the aluminum bromide. All of the decaborane and a part of the aluminum bromide dissolved in the cyclohexane. This mixture was passed downward through the glass reactor. The temperature of the reaction zone was maintained at 108° C. and gaseous ethylene (0.380 mole) and hydrogen chloride (about 0.15 mole) were passed over a period of 2 hours up through the reactor. The gases, which were introduced into the reactor system through a side arm 6 attached to the receiver, passed through the receiver (above the liquid level) into the heated reactor. 0.154 mole of ethylene was absorbed during the reaction. During the run the product flask was immersed in a bath maintained at 0° C. At the end of two hours the product of the flask, which was reddish-brown in color, was quenched with about 25 cc. of ice water which had been acidified with a trace of hydrochloric acid. After the water had been added, the reactor wall was washed down with about 20 cc. of cyclohexane in order to transfer any sublimed decaborane on the reactor wall into the product receiver. With the addition of the cyclohexane to the product flask two layers were formed; the top layer contained the cyclohexane and the product, the bottom layer was essentially water. A portion of the cyclohexane was removed under slightly reduced pressure with an aspirator. Next, the product flask was attached to a regular distilling apparatus and at a head temperature of 35° C. and at a pressure of 0.3 mm. of mercury, all of the water and cyclohexane were removed. Then the reddish-brown reaction product was distilled under vacuum to give two cuts. Cut 1, which came over at a head temperature of 43°–85° C. at 0.3 mm., weighed 3.1 g. and was a water-white liquid. Cut 2, which came over at a head temperature of 85°–104° C. at 0.3–0.4 mm., weighed 1.8 g. and was also a water-white liquid. At the conclusion of the distillation there remained a residue of 2.5 g. of viscous dark liquid which reacted with methanol.

By infrared analysis Cut 1 was shown to contain monoethyldecaborane and a small amount of diethyldecaborane together with some decaborane. Cut 2 was shown to contain monoethyldecaborane, diethyldecaborane and some decaborane.

*Example IV*

In this experiment, 10 grams (81 millimoles) of decaborane was melted and to it was added 2 grams (15 millimoles) of aluminum chloride. Ethylene and hydrogen chloride then were bubbled through the molten mixture for 12 minutes at 110° C. Then the oil bath surrounding the reaction flask was removed and the gas was allowed to bubble through the molten mixture for an additional 30 minutes, during which time the temperature dropped from 110° C. to 25° C. The resulting liquid was then decanted from the aluminum chloride and distilled. About 6 grams of decaborane was recovered. A distillate of 1.8 grams was obtained at 0.4 mm. of mercury pressure and 56°–68° C. head temperature. The pot temperature rose to 170° C. A syrupy residue of about 2 grams was left. Infrared analysis showed the distillate to be ethylated decaborane.

Our invention is also applicable to the production of other alkylated decaboranes, such as propylated decaboranes, in which event propylene will be substituted for the ethylene used in the specific examples, and is also applicable to the use of metal halide catalysts other than aluminum bromide and aluminum chloride, for example, gallium trichloride.

We claim:
1. A method for the preparation of liquid ethyldecaboranes which comprises passing ethylene and hydrogen chloride into a molten mixture of decaborane and an aluminum halide selected from the group consisting of aluminum bromide and aluminum chloride at a temperature from about 100° C. to 200° C.
2. The method of claim 1 wherein said aluminum halide is aluminum bromide.
3. The method of claim 1 wherein said aluminum halide is aluminum chloride.
4. A method for the preparation of liquid ethyldecaboranes which comprises passing ethylene and hydrogen chloride into a molten mixture of decaborane and an aluminum halide selected from the group consisting of aluminum bromide and aluminum chloride at a temperature from about 100° C. to 200° C., the reaction being conducted using from 0.01 to 2.5 moles of hydrogen chloride per mole of decaborane, from 0.05 to 0.5 mole of said aluminum halide per mole of decaborane, and from 0.5 to 4.0 moles of ethylene per mole of decaborane.
5. The method of claim 4 wherein said aluminum halide is aluminum bromide.
6. The method of claim 4 wherein said aluminum halide is aluminum chloride.

References Cited in the file of this patent

UNITED STATES PATENTS

| | | |
|---|---|---|
| 2,236,099 | Ipatieff et al. | Mar. 25, 1941 |
| 2,298,383 | Ipatieff et al. | Oct. 13, 1942 |